United States Patent [19]

Deutsch

[11] Patent Number: 4,660,359
[45] Date of Patent: Apr. 28, 1987

[54] AIR SYSTEM FOR A COTTON HARVESTER

[75] Inventor: Timothy A. Deutsch, Newton, Iowa

[73] Assignee: Deere & Company, Moline, Ill.

[21] Appl. No.: 664,122

[22] Filed: Oct. 23, 1984

[51] Int. Cl.[4] ............................................ A01D 46/08
[52] U.S. Cl. ......................................... 56/13.3; 56/30
[58] Field of Search ...................... 56/13.1, 13.2, 13.3, 56/12.8, 12.9, 16.4, 16.6, 30, DIG. 8

[56] References Cited

U.S. PATENT DOCUMENTS

| 2,493,422 | 1/1950 | Sartin | 56/30 |
| 3,401,510 | 9/1968 | Hubbard | 56/13.3 |
| 4,249,365 | 2/1981 | Hubbard et al. | 56/28 |
| 4,271,659 | 6/1981 | McConnell | 56/30 |
| 4,442,658 | 4/1984 | Cartner | 56/11.9 |

Primary Examiner—John J. Wilson

[57] ABSTRACT

Jet post assemblies providing both structural support and an air curtain over the floor panel structure of the cotton discharge compartment to increase the cotton-handling capacity of the compartment and prevent clogging in damp, high yield cotton. Air is bled from a nozzle located on the cotton-conveying duct and channelled through upright structural posts connected to the floor panel structure. Lower outlets in the posts direct air over the floor panel structure. The air preserves the kinetic energy of the doffed cotton and positively directs cotton to the discharge opening.

13 Claims, 4 Drawing Figures

AIR SYSTEM FOR A COTTON HARVESTER

BACKGROUND OF THE INVENTION

The present invention relates generally to a cotton harvester and more particularly to a cotton-conveying system for a cotton harvester.

In a cotton harvester, such as shown in U.S. Pat. Nos. 4,249,365 and 4,286,424 of common ownership with the present application, individual row units carry spindles which remove cotton from rows of cotton plants. Upright doffer assemblies doff the cotton from the spindles and direct the cotton rearwardly into a discharge compartment or suction door. The doffed cotton strikes a baffle or rear panel structure and then drops downwardly through a free fall zone to a cotton-receiving suction opening at the lower end of the discharge compartment. A duct extends upwardly from the discharge opening and connects the discharge compartment with a cotton receptacle on the harvester. A stream of air directed upwardly into the duct at a location downstream of the opening creates a vacuum at the opening and induces a draft in the compartment. The cotton is sucked through the opening and upwardly into the duct to the airstream location. The cotton is then blown into the receptacle by the airstream.

The above-described cotton-conveying system has proved to be satisfactory in most cotton-harvesting conditions but has suffered from certain limitations. In high yield cotton, a larger than normal volume of cotton impinges against the baffle or panel structure, and the cotton tends to clump and cause blockages at the bottom of the compartment, especially in damp conditions. Debris such as sap and stalks builds up on the structure to hinder cotton flow and increase the likelihood of a blockage. Although the induced draft in the compartment directs the cotton to the discharge opening, the source and direction of the draft are unpredictable and not always completely effective to prevent debris buildup and propel large volumes of cotton rearwardly through the opening.

In a four-row system such as shown in the aforementioned U.S. Pat. No. 4,249,365, or in other systems where one high volume discharge compartment receives cotton picked by two high capacity picker drums, the above-described problems are more evident. The sheer volume of cotton flowing downwardly in the compartment while harvesting high yield cotton increases the likelihood of a blockage. To alleviate debris buildup and blockages in certain field conditions, it has been necessary to reduce the ground speed of the cotton harvester and to perform frequent time-consuming cleanings of the discharge compartment, thereby decreasing the productivity of the cotton harvester.

BRIEF DESCRIPTION OF THE INVENTION

It is therefore an object of the present invention to provide an improved cotton-conveying system for a cotton harvester which overcomes the aforementioned problems. It is another object to provide such a system which increases the productivity of the cotton harvester in damp, high yield cotton.

It is a further object of the present invention to provide an improved cotton-conveying system for a cotton harvester which preserves the kinetic energy of the cotton moving through the discharge compartment to thereby reduce clumping and debris buildup.

It is still another object of the invention to provide an improved cotton-conveying system for a cotton harvester discharge compartment which services two upright picker drums and doffer assemblies.

It is a further object to provide a discharge compartment with increased material-handling capacity. It is another object to provide such a compartment wherein structural members serve an additional function of directing air towards the discharge opening to help prevent blockages and debris buildup.

It is still another object to provide an improved cotton-conveying system for a cotton harvester, including a discharge compartment opening into a suction duct, wherein air flow is more predictable and effective to positively move large volumes of cotton through the opening and into the suction duct.

In accordance with the above objects, at least one air jet is positioned near the forward end of the floor panel structure of the discharge compartment. The jet directs air, bled from the main air system, rearwardly over the surfaces of the floor panel structure towards the suction opening. As doffed cotton drops toward the floor panel structure, the moving air forms an air curtain which helps to propel the cotton rearwardly toward the opening. The doffed cotton retains much of its kinetic energy since it is directed rearwardly by both the induced draft and the air from the jet, rather than by induced draft alone. Cotton velocity is increased near the floor panel structure, and cotton flow is more positive and predictable. Increased cotton velocity increases the material-handling capacity of the discharge compartment, and there is less buildup of debris on the panel structure. The productivity of the cotton harvester is increased, especially in damp, high yield cotton.

These and other objects, features and advantages will become apparent to one skilled in the art from the description of the preferred embodiment and from the drawings.

DESCRIPTION OF THE PREFERRED EMBODIMENT

Figure 1:
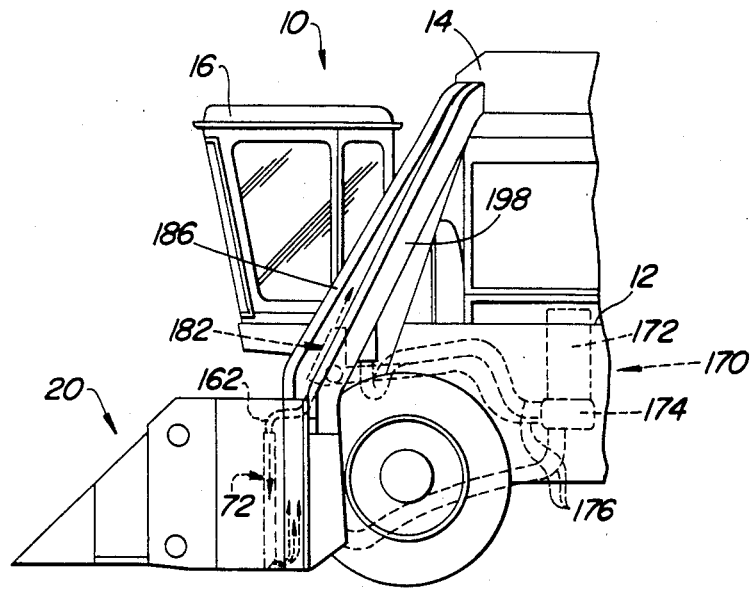
FIG. 1 is a side view of a portion of a four-row cotton harvester including the conveying system of the present invention.

Referring now to FIG. 1, therein is shown a cotton harvester 10 adapted for forward movement over a field planted with parallel rows of cotton. The harvester is generally of the type described in U.S. Pat. No. 4,249,365, having common ownership with the present application, and incorporated herein by reference for purposes of orienting the structure of the present invention. The harvester 10 includes a ground wheel supported frame 12 with a cotton-receiving receptacle or basket 14 located rearwardly of an operator cab 16.

Figure 2:
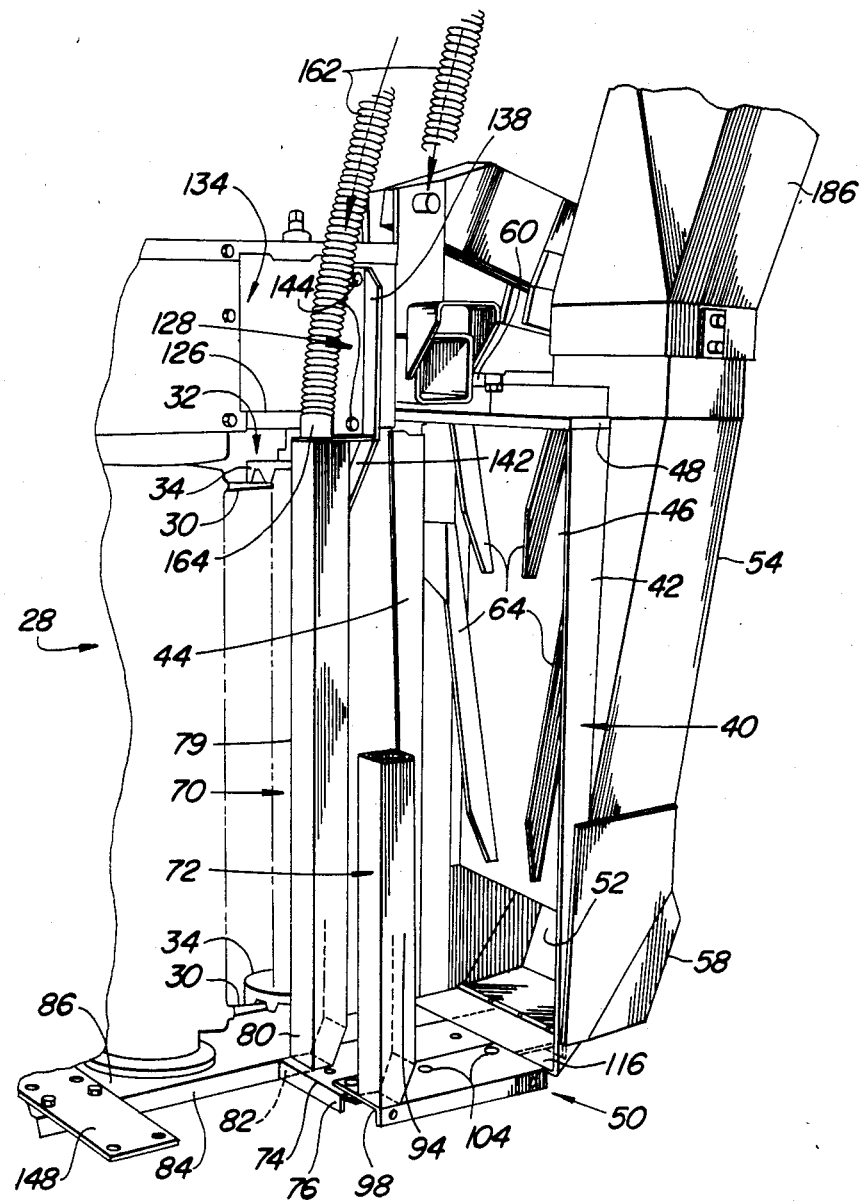
FIG. 2 is a perspective view of the front left portion of the cotton harvester of FIG. 1 with the outboard row unit removed to show the location of the air jet post assemblies with respect to the discharge compartment which services the adjacent inboard and outboard row units.

Two pairs of individual row units 20 are supported transversely on the forward portion of the frame 12. Each row unit 20 includes a pair of upright spindle drums 28 (FIG. 2) carrying a plurality of spindles 30 for removing the cotton from the plants. An upright doffer assembly 32 having a plurality of vertically spaced doffer pads 34 is located adjacent each upright spindle drum 28 to doff the cotton from the spindles 30 and direct it rearwardly towards a discharge compartment or suction door structure 40. In the embodiment shown in FIG. 2, the discharge compartment 40 services a pair of forward spindle drums 28 on adjacent units 20, only one of which is shown in FIG. 2. With the outboard unit 20 attached, the other one of the drums 28 for the other of the units 20 is located at a corresponding position transversely offset with respect to the first drum 28. A similar discharge compartment services the forward spindle drums 28 on a pair of row units 20 on the opposite side (right side) of the harvester 10.

The discharge compartment 40 (FIG. 2) includes upright sidewalls 42 and 44 transversely spaced by rear panel structure 46 and by a metal reinforcing band 48 located at the upper end of the compartment. The sidewalls 42 and 44 extend downwardly to bottom floor panel structure, indicated at 50, extending transversely between the sidewalls 42 and 44 and forwardly from a location below the rear panel structure 44. The rear panel structure 44 terminates above the panel structure 50 to define a suction opening 52 at the lower rear end of the compartment 40. A cotton-conveying suction duct 54 extends upwardly from the suction opening 52 behind the rear panel structure 46. A cleanout door 58 is hinged to the bottom panel structure 50 and provides access to the suction opening 52 and the lower portion of the suction duct 54. The discharge compartment 40 is connected by suitable brackets 60 to the inboard harvesting unit 20 of the pair of units with the compartment 40 opening forwardly in the direction of the upright doffer assembly 32. The discharge compartment 40 also opens forwardly toward the upright doffer assembly (not shown) for the adjacent row unit 20 of the pair when attached. Upright cotton-directing structure 64 extends forwardly from the rear panel structure 46 from the top of the discharge compartment 40 to the suction opening 52 to prevent cotton doffed from one of the row units from being thrown into the adjacent doffer assembly area. For a more detailed description of the interconnections and support of the row units 20, reference may be had to the aforementioned U.S. Pat. No. 4,249,365.

To provide a jet of air over the floor panel structure 50, a pair of jet post assemblies 70, 72 are provided forwardly of the discharge compartment 40. The jet post assemblies 70 and 72 not only deliver air to the floor panel structure 50 and the compartment 40, but also serve as structural members for the inboard and outboard units 20, respectively. The jet post assembly 70 includes a floor angle 74 having a generally box-shaped structure opening downwardly and including rearwardly and forwardly directed flanges 76 and 78, respectively. An upright tubular post 79 having a generally rectangular cross section includes a lower end 80 welded to the forward inside corner of the floor angle 74. The floor angle 74 includes a downwardly directed inner flange 82 which is connected to a fore-and-aft extending flange 84 of floor 86 on the inboard row unit 20 by bolts (not shown) passing through apertures in the flanges. The floor angle 74 includes two rows of fore-and-aft apertures 88 adjacent an outer partial flange 90.

The outboard jet post assembly 72 includes an upright hollow tubular post 94 generally identical to the post 79 and having a lower end 96 welded to the corner of an angle 98 which includes an inner apertured edge 102 and is positioned over the top surface of the floor angle 74. The angle 98 is connected to the floor angle 74 by a series of bolts 104 which are inserted through the apertures of the edge 102 and through one of the rows of the apertures 88 depending on the row spacing between the individual row units 20. The angle 98 includes a downturned flange 106 which is apertured at 108 and which, when the outboard unit 20 is attached, is bolted to a flange (not shown) which is similar to and faces the flange 84 on the inboard unit 20.

The flange 78 at the aft end of the floor angle 74 supports a pair of rearwardly directed threaded studs 114. The floor panel structure 50 includes a rearwardly and slightly upwardly directed connecting panel 116 which extends between the sidewalls 42 and 44 and supports a downwardly directed bracket (not shown) thereunder behind the forward edge of the panel. The bracket receives the threaded studs 114 and nuts are threaded over the ends of the studs to secure the aft end of the floor angle 74 against the bottom portion of the compartment 40. As best seen in FIG. 2, the floor panel structure 50 is thus defined by the connecting panel 116 and the top surfaces of the angles 74 and 98 which extend forwardly from the opening 52. The structure 50 therefore substantially closes the lower area between the inboard and outboard row units 20 rearwardly adjacent the doffer assemblies 32. The posts 79 and 94 extend upwardly and terminate in upper ends 122 and 124 adjacent respective center sheet structure 126 on the respective row units 20. Connecting bracket structures 28 and 130 are connected to the upper ends 122 and 124, respectively, for tieing the jet post assemblies 70 and 72 into the upper housing structure framework, indicated generally at 134, of the respective row units 20. The brackets 128 and 130 are substantially mirror images of each other, and each includes a horizontally disposed angle 136 welded to the top of the respective posts and extending rearwardly therefrom. An upright angle 138 is welded to the aft end of the angle 136 and extends upwardly therefrom. A reinforcing angle 141 is welded to, and extends diagonally between, the angle 136 in the top of the corresponding post. The upper ends of the upright angles 138 are apertured at 140, and apertures 142 extend through the bottom of the angle 138 and through the upwardly disposed flange of the horizontal angle 136. The outwardly directed faces of the upright angles 138 are secured against the housing structure framework 134 by bolts 144 (FIG. 2). The jet post assemblies 70 and 72 therefore provide substantial structural support between the floor 86 and the housing structure framework 134 of the respective row units 20. The floor angles 74 and 98 also provide transverse structural rigidity between adjacent row units 20 and help to maintain the proper spacing between the units. A conventional strap 148 is also connected between the floors 86 of the adjacent inboard and outboard units 20 for additional transverse stability.

Figure 4:
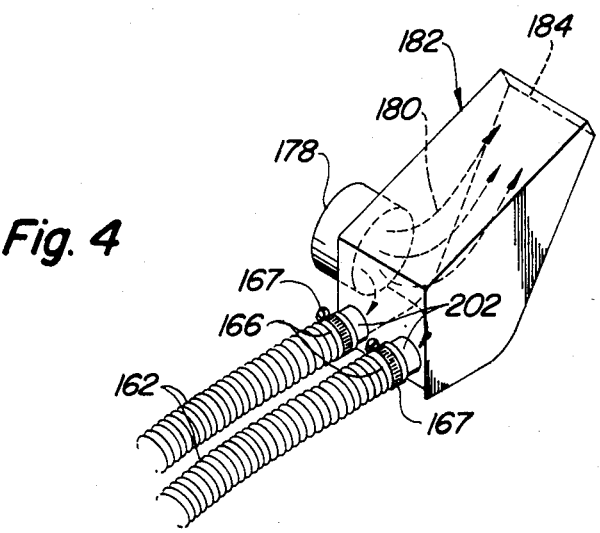
FIG. 4 is a perspective view of the distribution nozzle on the central cotton-conveying duct and a portion of the conduits which connect the nozzle with the jet post assemblies.
Figure 3:
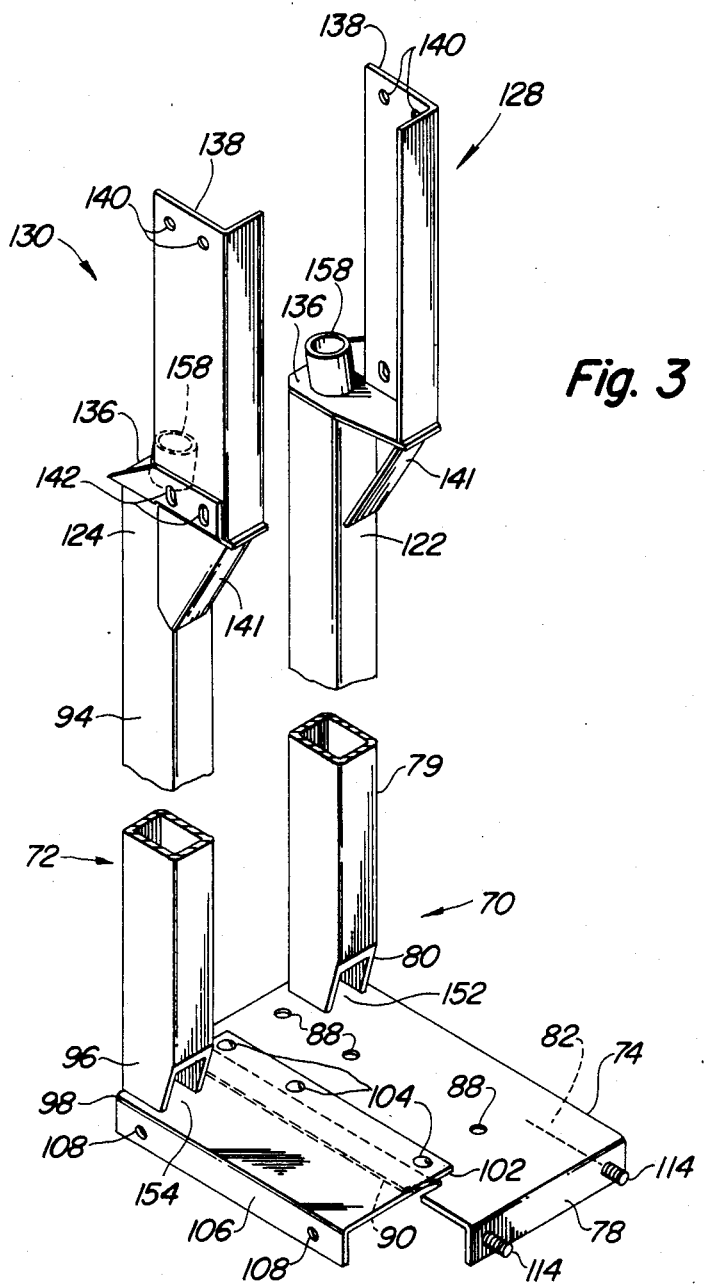
FIG. 3 is an enlarged perspective view of the jet post assemblies of FIG. 2.

In the preferred embodiment the posts 79 and 94 are hollow and have a rectangular cross section with the transverse dimension being slightly larger than the fore-and-aft dimension. It has been found that a 1.5 by 2.0 inch tubing with a 0.12 inch wall provides good structural support with more than adequate air-carrying capacity. The lower post ends 80 and 96 have rearwardly facing jet post outputs or apertures 152 and 154, respectively which are formed by removing approximately 1.6 inches of the rearwardly directed walls of the posts. The apertures 152 and 154 are cut at an angle of approximately twenty degrees forwardly with respect to the rearwardly directed wall portion so that the sidewalls adjacent the apertures are angled downwardly and forwardly as seen in FIGS. 2 and 3. The horizontal angles 136 welded to the post tops 122 and 124 generally close the upper ends of the posts, but the angles 136 are apertured and cylindrically shaped hose connections 158 are welded to the angles 136 around the apertures. The lower ends of the hose connections 158 are cut at a slight angle so that the axes of the connections 158 slant inwardly at an angle with respect to the corresponding posts. A source of air is attached to the hose connections 158 to provide air flow through the hollow interior of the posts 79 and 94 and out the corresponding apertures 152 and 154 so that air is delivered over the floor panel structure 50 and through the opening 52. Preferably the source of air includes flexible hoses 162 of inner diameter on the order of 1.25 inches and having output ends 164 positioned over the hose connections 158 on the jet post assemblies 70 and 72. The hoses 162 include input ends 166 connected by hose clamps 167 to a portion of the air system, indicated generally at 170 in FIG. 1. The air system 170 is generally of conventional construction, such as of the type described in U.S. Pat. No. 4,271,659, and includes a fan 172 for supplying air to a manifold 174. The air is distributed from the manifold to various air duct locations on the harvester via large supply conduits 176. One of the conduits 176 is connected to an input port 178 (FIG. 4) opening into air chamber 180 of a distribution nozzle 182 having a jet nozzle output 184 opening in the downstream direction in an upwardly and rearwardly directed air duct 186 which is connected to the suction duct 54 for the compartment 40. For a more detailed description of the air duct system, reference may be had to the aforementioned U.S. Pat. No. 4,271,659.

In the preferred embodiment, the input ends of the hoses 162 are connected to hose connections 202 supported at the lower end of the distribution nozzle 182 and opening into the distribution nozzle chamber 180. A portion of the air from the air system 170 is therefore bled from the nozzle 182 and supplied to the jet post assemblies 70 and 72. The air is directed by way of the hollow interiors of the posts 79 and 94 and through the jet post outputs over the floor panel structure 50 and into the section opening 52 to keep the floor dry and free of trash, dirt and debris. Therefore, a clearer path from the doffer assemblies 32 through the suction opening 52 and into the duct 54 is maintained. The air from the posts 79 and 94, in effect, provide a turbo-charging effect for increased cotton-conveying capacity.

In operation, the cotton picked from the plants by the spindles 30 is doffed by the doffers 34 and directed rearwardly behind the posts 79 and 94 towards the rear panel 46 of the compartment 40. The harvested cotton falls toward the suction opening 52 and the induced draft through the opening 52 caused by the air flowing downstream in the duct 186 from the nozzle 182, in combination with the jets of air passing through the apertures 152 and 154 over the floor panel structure 50, propel the cotton into the cotton-conveying duct system of the harvester.

Having described the preferred embodiment, it will be apparent that modifications can be made without departing from the scope of the invention as defined in the accompanying claims.

I claim:

1. In a cotton harvester adapted for forward movement over a field of cotton plants, said harvester having a cotton receptacle and a row-harvesting unit, said row unit having an upper framework, an upright cotton discharge compartment including upright panel structure, a cotton-receiving opening located adjacent the lower end of the panel structure, floor structure extending forwardly from the panel structure, spindle means for removing cotton from the row of cotton plants, and doffer means for doffing the cotton from the spindles and directing the cotton along a path towards the panel structure wherein the cotton drops along the panel structure towards the floor structure and opening, a conveying structure comprising: duct means extending from the cotton-receiving opening towards the cotton receptacle, said duct means including nozzle means located downstream from the opening for creating a vacuum at the opening and propelling the doffed cotton towards the receptacle, and air jet means located in the cotton path downstream of the doffer means and adjacent the forward end of the floor structure opposite the cotton-receiving opening for directing a jet of air over the floor structure and through the opening to maintain the kinetic energy of the cotton dropping along the panel and positively direct the cotton towards the opening.

2. The cotton harvester as set forth in claim 1 including at least two row units, wherein the discharge compartment services two adjacent doffer means and wherein said air jet means includes two hollow post assemblies located adjacent said two doffer means, said hollow post assemblies each including an upper end fixed to the upper framework and a lower end connected to and supporting the floor structure, said lower end including a rearwardly directed opening, and a source of air connected to the upper end of each post assembly.

3. The cotton harvester as set forth in claim 2 further including a source of pressurized air connected to the nozzle means, and means for bleeding a portion of the pressurized air from the nozzle means to the air jet means.

4. In a cotton harvester having a cotton receptacle and transversely spaced row-harvesting units including an upright cotton discharge compartment with forwardly facing upright panel structure and lower generally horizontal floor structure, a suction opening located at the lower end of the panel structure above the floor structure, spindle means for removing cotton from cotton plants, upright doffer means for doffing the cotton from the spindles and directing the cotton toward the panel structure, conveying structure comprising: duct means extending upwardly from the cotton-receiving opening towards the receptacle, said duct means including nozzle means located upstream from the opening for creating a vacuum at the opening and propelling removed cotton towards the receptacle, air jet means for directing air over the floor structure and toward the opening for intercepting the doffed cotton prior to contacting the floor structure to propel the doffed cotton towards the opening, said air jet means comprising a hollow structural member having one end opening adjacent the floor structure and a second end, and a source of air connected to the second end.

5. The cotton harvester as set forth in claim 4 wherein the nozzle means includes an air chamber, and an inlet and outlet opening into the chamber, and means for connecting the nozzle means to the duct means with the outlet opening into the duct means, a source of pressurized air connected to the inlet, and conduit means extending between the chamber and the second end of the air jet means for supplying air under pressure from the compartment to the air jet means.

6. In a cotton harvester adapted for forward movement over a field with parallel rows of cotton plants, a plurality of transversely spaced row-harvesting units, each unit having an upper framework and upright spindle drum means extending downwardly from the framework with spindles for removing cotton from the plants, and upright doffer means fro doffing the cotton from the spindles and directing the cotton along a generally rearwardly directed cotton-conveying path, an upright discharge compartment opening forwardly into the paths of the rearwardly directed cotton from a pair of adjacent doffer means, the discharge compartment including upright, transversely extending rear panel structure extending into the path of the doffed cotton, and a suction opening located at the bottom of the rear panel structure, floor structure extending forwardly from the opening and generally closing the lower end of the compartment, a cotton-conveying duct extending upwardly and rearwardly from the opening, means for conveying the cotton rearwardly through the opening and through the duct, said means for conveying comprising air nozzle means opening in the downstream direction into the duct downstream of the suction opening for inducing air flow in the downstream direction through said opening, an upright structural member located adjacent the doffer means, said structural member having a hollow interior and connected at its lower end to the floor structure and at its upper end to the framework, said structural member including an outlet opening rearwardly in the path downstream of the doffer means and over the floor structure, said outlet opening communicating with the hollow interior, and means directing an additional air flow over the floor structure for aiding the induced air flow in propelling cotton through the suction opening, said means directing including a source of air connected adjacent the upper end of the structural member in fluid communication with the hollow interior.

7. The cotton harvester as set forth in claim 6 wherein the means for directing an additional air flow comprises a conduit having one end connected to the upper end of the structural member adjacent the framework and an opposite end connected to the air nozzle means.

8. The cotton harvester as set forth in claim 7 wherein the air nozzle means comprises a manifold chamber connected to the duct, said chamber including an inlet, a first outlet opening into the duct, and a second outlet connected to said one end of the conduit.

9. In a cotton harvester including at least one fore-and-aft extending framed row unit for removing cotton from cotton plants, a suction door assembly, said door assembly including an upright rear wall, an opening located adjacent the lower end of the rear wall, floor structure extending forwardly under the opening, a duct having an upstream end in communication with the opening, nozzle means connected to the duct downstream of the opening for directing a stream of air in the downstream direction and creating a suction effect at the opening, and upright doffing means for directing removed cotton generally towards the rear wall so that the cotton falls towards the floor and propelled through the opening at least in part by the suction effect, the improvement comprising:

said door assembly comprising two transversely spaced structural members, each structural member having a hollow interior extending upwardly from the floor forwardly of the opening and including a rearwardly directed air outlet located adjacent the floor structure and communicating with the hollow interior, an air conduit connected to the upper end of each hollow structural member, air supply means connected to the conduit for introducing a flow of air through the structural members and air outlets to help propel cotton through the opening and into the duct, first and second angles connected to the lower ends of the respective structural members, and means connecting the angles for permitting the structural members to be adjusted transversely with respect to each other.

10. The invention as set forth in claim 9 wherein each structural member comprises a hollow upright tubular beam having a lower end fixed to the floor structure and an upper end fixed to the frame structure adjacent the upper end of the doffing means for providing vertical rigidity to the row unit.

11. The invention as set forth in claim 9 wherein the angles define the forward portion of the floor structure adjacent the lower end of the doffing means.

12. The invention as set forth in claim 9 wherein the harvester includes a pair of adjacent framed row units and one of said structural members is connected between the frame of one of the units and the floor structure, and the other of said structural members is connected between the frame of the other of said pair of units and the floor structure.

13. The invention as set forth in claim 12 including means for adjusting the structural members transversely with respect to each other.

* * * * *